INVENTORS
WOODROW P. KIMSEY
ROGER M. SMITH
DONALD H. STROOT
BY Fryer and Johnson
ATTORNEYS United States Patent Office 2,831,275
Patented Apr. 22, 1958

2,831,275
REVERSIBLE BIT FOR SCRAPER BOWL EDGES

Woodrow P. Kimsey, Lockport, Roger M. Smith, Joliet, and Donald H. Stroot, New Lenox, Ill., assignors to Caterpillar Tractor Co., Peoria, Ill., a corporation of California Application October 17, 1955, Serial No. 540,815

2 Claims. (Cl. 37—141)

This invention relates to vertical cutting bits of the type normally employed on earthmoving implements, and is particularly useful in connection with earthmoving scrapers having an open-end material collecting and conveying bowl provided with a cutting blade or lip extending transversely of the forward edge of the bottom of the bowl.

In addition to the transverse cutting edge, it is customary to attach short cutting bits or blades to the outside of the lower leading edges of the vertical walls of the scraper bowl as by bolts. It is the purpose of these vertical cutting blades to slice through the earth as the implement is moved forwardly when filling the bowl to insure a clean cut. As the implement is drawn through the earth, the lower leading edges of the scraper bowl, if not provided with bits, are subject to excessive erosion and wear to the extent that periodically these areas of the bowl walls must be cut out and new sections welded in place. Repairs of this type are expensive and time-consuming.

Furthermore, as the implement is drawn through the earth, mounting bolts for cutting bits of the type described are subjected to high shearing stresses and for this reason, breakage of the bolts is a continuing problem.

It is the object of the present invention, therefore, to provide easily replaceable vertical cutting bits or blades for earthmoving equipment which will effectively protect the leading edges of the bowl walls against wear and erosion.

It is a further object of the present invention to provide means in combination with a vertical cutting bit which is effective to substantially reduce shearing stresses on the mounting bolts for the cutting bit.

It is a still further object of the present invention to provide a cutting bit or blade of the type described, which is reversible, thereby substantially increasing the service life of the part.

Still further objects and advantages are made apparent in the following specification.

Figure 1:
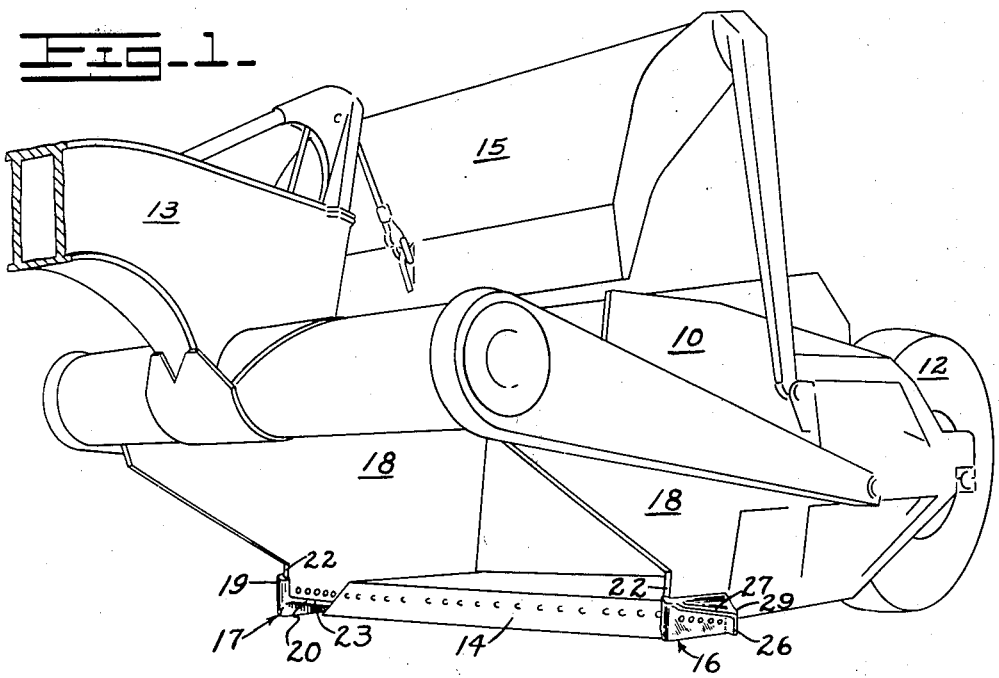
Fig. 1 is an isometric view of an earthmoving scraper showing the relationship of the cutting bits in question to the machine.

In Fig. 1 of the drawings, a scraper of the type in which the present invention may be employed is illustrated as comprising a main bowl or body portion 10 supported adjacent its rear end by a pair of ground-engaging wheels, one of which is shown at 12. The scraper is supported at its forward end on a tractor (not shown) by a draft connection 13. The scraper bowl is provided with a blade 14 adjacent its forward portion to effect collection of earth in the bowl in the usual manner. The bowl is provided with a front gate or apron 15 which may be closed to prevent the earth from spilling from the bowl as it is being transported, and which also serves the purpose, when partially closed, of regulating the amount of earth that can pass into the bowl during loading operations.

When loading, the bowl is lowered about the axis of its supporting wheels 12 until its scraping blade 14 engages the ground, and as the tractor draws the scraper forwardly, the earth engaged by the scraping blade will be deposited in the bowl in the usual manner.

Vertical cutting bits generally indicated at 16 and 17 are secured to the outside of the vertical bowl walls 18 as by bolts 21. Each cutting bit is provided with a vertical flange 19 and an intersecting flange 20 extending rearwardly therefrom at the same angle as the lower leading edge of vertical walls 18. The flange 19 tapers in thickness from the outside of the bowl toward the inside thereof to direct earth inwardly. When the vertical bit is secured to the scraper bowl wall, the rear side of flange 19 abuts the vertical leading edge 22 of the scraper wall, and the upper side of flange 20 underlies the lower leading edge 23 of the bowl wall. Thus, erosion and wear on edges 22 and 23 are substantially reduced as compared with the conventional cutting bit wherein a flat plate is attached to the outside of the bowl wall. Furthermore, as the scraper is drawn through the earth, the abutment of the rear side of flange 19 against vertical edge 22 absorbs the force tending to move the cutting bit rearwardly as the scraper is drawn through the earth, and thus high shearing stresses in the mounting bolts 21 are prevented.

Figure 2:
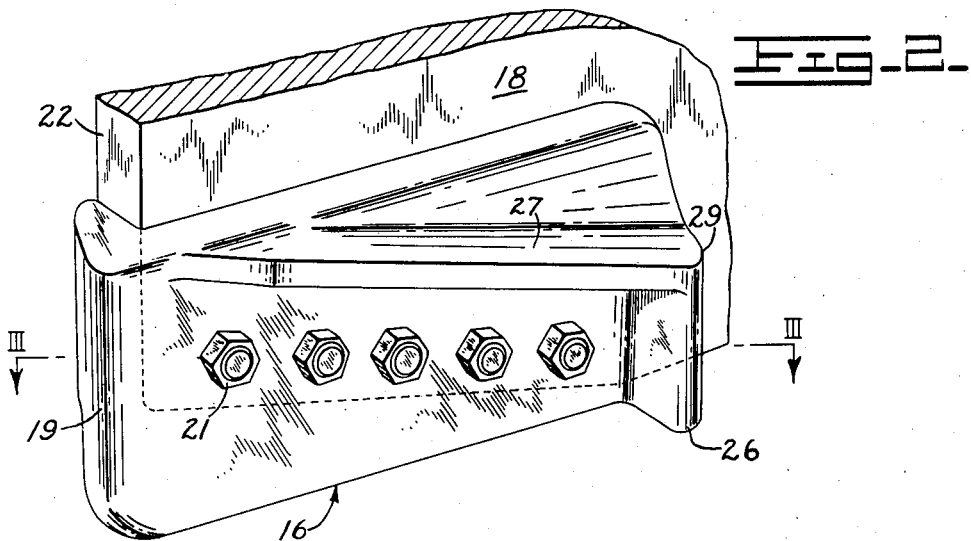
Fig. 2 is an enlarged fragmentary view in isometric of the cutting bit of the present invention.
Figure 3:
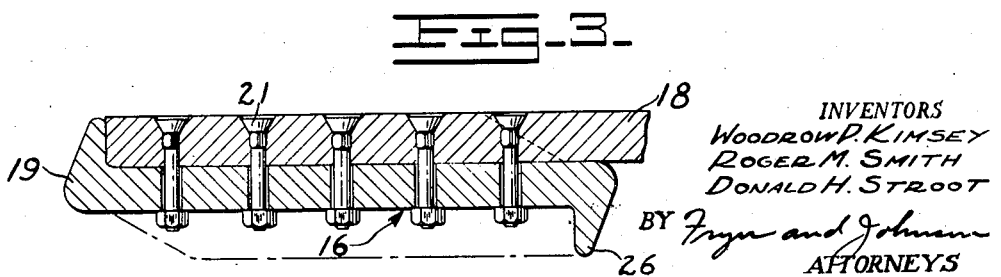
Fig. 3 is a fragmentary view taken along the line III—III of Fig. 2.

As is best shown in Fig. 2, the sides of cutting bits 16 and 17 not adjacent the vertical bowl walls are likewise provided with a vertical flange 26 and an inclined flange 27. Thus, when the leading edge of cutting bit 16 becomes worn when installed in the position shown in Fig. 1, the bit may be removed, then reversed and installed on the opposite wall of the scraper bowl with flange 26 abutting the bowl edge 22 and flange 27 abutting bowl edge 23, so that the unworn cutting surface 29 faces forwardly. Similarly, cutting bit 17 can be removed and installed on the opposite wall of the bowl with an unworn surface extending forwardly. Through the construction described the useful life of a pair of cutting bits is doubled.

We claim:

1. In an earthmoving implement comprising a first wall and a second wall spaced therefrom to support a material collecting blade and each having a leading edge and a lower edge, reversible cutting blades for said walls, said reversible blades carrying first flanges extending from one side thereof and abutting the leading and lower edges of the first wall when the reversible blade is secured thereto, and second flanges extending from the opposite side of each reversible blade to abut the leading and lower edges of said second wall when the reversible blade is secured thereto.

2. In combination with an earthmoving scraper having a bowl for collection of earth, a horizontal cutting edge at the forward portion of the bowl, and side walls with portions extending forwardly of said cutting edge presenting forward edges and lower edges subject to abrasive action by the earth, protective bits for said portions each comprising a substantially flat plate bolted to each of said portions with ribs projecting from one side which overlie the forward and lower edges of its associated portion, and similar ribs projecting from the other side of each of said protective bits to overlie the same edges of the other portion when the plates are interchanged and reversed in position.

References Cited in the file of this patent

UNITED STATES PATENTS 2,304,786    Armington             Dec. 15, 1942
2,716,824    Francis                Sept. 6, 1955